(12) United States Patent
Kim

(10) Patent No.: US 12,522,195 B2
(45) Date of Patent: Jan. 13, 2026

(54) METHOD OF CONTROLLING VEHICLE BY ALTITUDE PREDICTION BASED ON IDENTIFICATION OF HIGH-ENERGY AREAS AND VEHICLE USING THE SAME

(71) Applicants: Hyundai Motor Company, Seoul (KR); Kia Corporation, Seoul (KR)

(72) Inventor: Young Kwang Kim, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 105 days.

(21) Appl. No.: 18/507,684

(22) Filed: Nov. 13, 2023

(65) Prior Publication Data

US 2024/0400035 A1 Dec. 5, 2024

(30) Foreign Application Priority Data

Jun. 2, 2023 (KR) .......................... 10-2023-0071323

(51) Int. Cl.

| | |
|---|---|
| *B60W 10/26* | (2006.01) |
| *B60W 40/076* | (2012.01) |
| *B60W 50/00* | (2006.01) |
| *G01C 21/00* | (2006.01) |
| *G01C 21/34* | (2006.01) |
| *G06F 18/2321* | (2023.01) |

(52) U.S. Cl.
CPC .......... *B60W 10/26* (2013.01); *B60W 40/076* (2013.01); *B60W 50/0097* (2013.01); *G01C 21/3469* (2013.01); *G01C 21/3822* (2020.08); *G06F 18/2321* (2023.01); *B60W 2050/0056* (2013.01); *B60W 2552/05* (2020.02); *B60W 2552/15* (2020.02); *B60W 2556/40* (2020.02)

(58) Field of Classification Search
CPC .............. B60W 10/26; B60W 40/076; B60W 50/0097; B60W 2050/0056; B60W 2552/05; B60W 2552/15; B60W 2556/40; G01C 21/3469; G01C 21/3822; G06F 18/2321
USPC .......................................................... 701/22
See application file for complete search history.

(56) References Cited

U.S. PATENT DOCUMENTS

| | | | | |
|---|---|---|---|---|
| 8,417,401 | B2* | 4/2013 | Takahara | ................ B60L 50/16 701/22 |
| 9,238,418 | B2* | 1/2016 | Ryu | ........................ H01M 8/00 |
| 9,988,037 | B2* | 6/2018 | Prakah-Asante | ..... B60W 10/22 |
| 2016/0257295 | A1* | 9/2016 | Miller | ............... B60W 50/0097 |
| 2018/0260626 | A1* | 9/2018 | Pestun | ..................... G08G 5/80 |
| 2023/0332918 | A1* | 10/2023 | Haga | .................. G01C 21/3815 |

FOREIGN PATENT DOCUMENTS

JP 2012098061 A * 5/2012

* cited by examiner

*Primary Examiner* — Isaac G Smith
(74) *Attorney, Agent, or Firm* — Slater Matsil, LLP

(57) ABSTRACT

In an embodiment, a method of controlling a vehicle by altitude prediction based on identification of a high-energy area is provided. The method can include identifying a high-energy spot based on a reference altitude change and map information including altitude data, clustering high-energy spots for each area to set a high-energy area and generating area information, and performing driving power control based on at least location information of the vehicle and the area information in response to the vehicle travel path including the high-energy area.

20 Claims, 9 Drawing Sheets

FIG. 7

| Region Number | Min. Lat. | Max. Lat. | Min. Lon. | Max. Lon. | Min. Alt. | Max. Alt. |
|---|---|---|---|---|---|---|
| 1 | 35.1100 | 35.3875 | 127.4800 | 127.8500 | 263.0000 | 642.0000 |
| 2 | 35.9425 | 36.0350 | 127.6650 | 127.7575 | 463.0000 | 487.0000 |
| 3 | 35.7575 | 35.8500 | 128.1275 | 128.2200 | 243.0000 | 436.0000 |
| 4 | 36.6825 | 36.7750 | 128.3125 | 128.4975 | 296.0000 | 429.0000 |
| 5 | 36.6825 | 38.4400 | 128.3125 | 129.4225 | 86.0000 | 825.0000 |
| 6 | 36.9600 | 37.0525 | 128.6825 | 128.9600 | 453.0000 | 783.0000 |
| 7 | 36.3125 | 36.3125 | 129.3300 | 129.3300 | 201.0000 | 201.0000 |

METHOD OF CONTROLLING VEHICLE BY ALTITUDE PREDICTION BASED ON IDENTIFICATION OF HIGH-ENERGY AREAS AND VEHICLE USING THE SAME

CROSS-REFERENCE TO RELATED APPLICATIONS

This application claims the benefit of Korean Patent Application No. 10-2023-0071323, filed on Jun. 2, 2023, which application is hereby incorporated herein by reference.

TECHNICAL FIELD

The present disclosure relates to a method of controlling a vehicle by altitude prediction.

BACKGROUND

Forward altitude prediction is essential for vehicle driving power control and accurate distance to empty (DTE) calculation. Here, a vehicle may be an electrified vehicle driven based on electric energy. In the case of an electrified vehicle, the vehicle uses a battery as a buffer to absorb gravitational potential energy through regenerative braking to charge the battery in a downhill section or to operate a driving motor to increase potential energy using energy stored in the battery in an uphill section. In addition, in the case of a vehicle that charges a battery according to power generation of a fuel cell, the vehicle may charge the battery with power necessary to climb a hill by generating power in the fuel cell according to a state of an uphill section.

Since the amount of exchange between energy stored in the battery and potential energy is large in a high-energy area such as a high-gradient section, the need for predicting a distance to empty and predictive control of the fuel cell may arise. If the predictive control of the fuel cell is not accompanied, normal driving is substantially impossible due to a continuous drop in the battery charge state during driving in a high-weight and high-gradient section, and forced charging of the high-voltage battery may be required after stopping.

If an electric energy-based vehicle does not consider the forward gradient in predicting the distance to empty, a non-drivable situation may occur in the uphill section due to battery discharge earlier than expected. In addition, even when driving is possible from the point of view of gravity-based potential energy, if the distance to empty is not considered in the downhill section, the vehicle can induce unnecessary charging.

In the case of an electrified vehicle, forward altitude prediction is more necessary for prediction of power generation control of a fuel cell, output control of a high-voltage battery, regenerative braking, and remaining mileage prediction.

A conventional road-based forward gradient prediction method utilizes a method of securing and continuously updating road information for each region. Due to a large amount of road information and frequently updated information for each region, a capacity to store the information or real-time communication is required. Conventional forward gradient prediction utilizes a large amount of road information to control driving power, resulting in low efficiency in terms of memory storage and altitude prediction calculation of the forward road.

SUMMARY

The present disclosure relates to a method of controlling a vehicle by altitude prediction based on identification of a high-energy area and a vehicle using the same, and more particularly, to a vehicle control method and the vehicle capable of identifying a substantial high-energy area in an area of interest and implementing driving power control suitable for the area.

The present disclosure describes a vehicle control method and a vehicle capable of identifying a substantial high-energy area in an area of interest and implementing driving power control suitable for the area.

The technical problems solved by embodiments in the present disclosure are not necessarily limited to the technical problems mentioned above, and other technical problems not mentioned herein can be clearly understood by those of ordinary skill in the art to which the present disclosure pertains from the following description.

According to an embodiment of the present disclosure, a method of controlling a vehicle by altitude prediction based on identification of a high-energy area, includes identifying a high-energy spot based on a reference altitude change and map information including altitude data, clustering high-energy spots for each area to set a high-energy area and generating area information, and performing driving power control based on at least location information of the vehicle and the area information when the vehicle travels in the high-energy area.

According to an embodiment of the present disclosure, the method can further include generating map information having representative trend information by a smoothing process of the map information, before generating the high-energy spot.

According to an embodiment of the present disclosure, the method can further include smoothing the altitude data using a Gaussian filter based on a predetermined filter size, and the filter size can be determined based on a set unit distance according to output performance of an energy source module providing driving power.

According to an embodiment of the present disclosure, the reference altitude change can be defined as an altitude change requiring a change in plan of driving power control applied to current driving of the vehicle, and the defined altitude change can be an altitude difference value in which driving power to be consumed when the vehicle moves by a set unit distance at a predetermined speed is determined to be greater than reference power consumption.

According to an embodiment of the present disclosure, identifying the high-energy spot can include selecting a preliminary high-energy spot based on the map information and the reference altitude change, determining a road type applied according to a type of the vehicle, and determining a preliminary high-energy spot related to a road belonging to the road type as the high-energy spot.

According to an embodiment of the present disclosure, the method can further include generating inclination data based on altitude data of the map information before identifying the high-energy spot. Identifying the high-energy spot can include extracting the high-energy spot based on the inclination data and the reference altitude change. Also, the area information can include cluster information of the high-energy area and spot information of the high-energy spot belonging to the high-energy area.

According to an embodiment of the present disclosure, the cluster information can include a maximum altitude, a minimum altitude, and latitude and longitude ranges of the high-energy area. The spot information can include inclination data for each high-energy spot.

According to an embodiment of the present disclosure, the clustering of the high-energy spot can include grouping the high-energy spots within a movement window continuously detected by the movement window using a predetermined radius. The predetermined radius can be set greater than a set unit distance based on output performance of an energy source module providing driving power. A shift of the movement window can be moving the movement window to include the high-energy spot previously detected within the movement window.

According to an embodiment of the present disclosure, performing the driving power control can include predicting forward gradient information of a route to be traveled based on a traveling direction of the vehicle along with the location information of the vehicle and the area information, and performing driving power control based on the predicted forward gradient information.

According to an embodiment of the present disclosure, the vehicle can include at least an electric energy-based energy source module, and the driving power control can be performed to control the energy source module according to a charging-oriented or discharging-oriented power plan based on state information of the energy source module and the forward gradient information.

According to an embodiment of the present disclosure, a vehicle controlled by altitude prediction based on identification of a high-energy area, can include a sensor unit configured to detect a state of the vehicle and an external environment, a memory configured to store at least one instruction, and a processor configured to execute the at least one instruction stored in the memory based on data obtained from the sensor unit and the memory. In an embodiment, the processor can be configured to identify a high-energy spot based on a reference altitude change and map information including altitude data, cluster high-energy spots for each area to set a high-energy area and generate area information, and perform driving power control based on at least location information of the vehicle and the area information when the vehicle travels in the high-energy area.

The features briefly summarized above for this disclosure are only exemplary embodiments of the detailed description of the disclosure which follow, and are not intended to limit the scope of the disclosure.

The technical problems solved by embodiments of the present disclosure are not necessarily limited to the above technical problems and other technical problems which are not described herein can be clearly understood by a person (hereinafter referred to as an ordinary technician) having ordinary skill in the technical field, to which the present disclosure pertains, from the following description.

BRIEF DESCRIPTION OF THE DRAWINGS

The above and other features and advantages of embodiments of the present disclosure can be more clearly understood from the following detailed description taken in conjunction with the accompanying drawings, in which:

FIG. 7 is a view illustrating tabulated area information of a high-energy area, according to an embodiment of the present disclosure;

DETAILED DESCRIPTION OF ILLUSTRATIVE EMBODIMENTS

Figure 1:
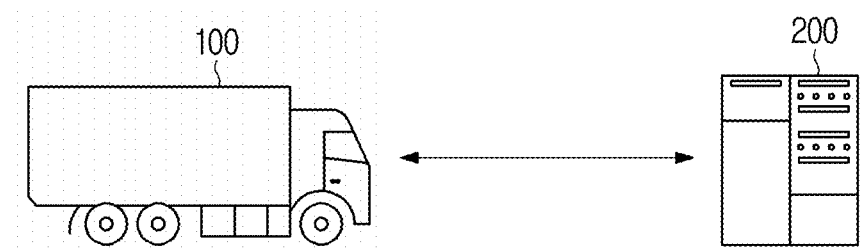
FIG. 1 is a view illustrating a vehicle communicating with another device and transmitting and receiving data, according to an embodiment of the present disclosure.

Hereinafter, exemplary embodiments of the present disclosure will be described in detail with reference to the accompanying drawings so that those skilled in the art can easily implement the present disclosure. However, the present disclosure can be implemented in various different ways, and is not necessarily limited to the embodiments described herein.

In describing exemplary embodiments of the present disclosure, well-known functions or constructions can be omitted and not described in detail because they can unnecessarily obscure the understanding of the present disclosure. The same constituent elements in the drawings are denoted by the same reference numerals, and a repeated description of the same elements can be omitted.

In the present disclosure, when an element is simply referred to as being "connected to", "coupled to", or "linked to" another element, this can mean that an element is "directly connected to", "directly coupled to", or "directly linked to" another element or is connected to, coupled to, or linked to another element with other element(s) intervening therebetween. In addition, when an element "includes" or "has" an element, one element can further include another element without excluding another component unless specifically stated otherwise.

In the present disclosure, the terms first, second, etc. can be used to only distinguish one element from another and do not necessarily limit the order or the degree of importance between the elements, unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other can be for clearly describing each feature, and do not necessarily mean that the elements are separated.

That is, a plurality of elements can be integrated in one hardware or software unit, or one element can be distributed and formed in a plurality of hardware and/or software units. Therefore, even if not mentioned otherwise, such integrated or distributed embodiments are included in the scope of the present disclosure.

In the present disclosure, elements described in various embodiments do not necessarily mean essential elements, and some of them can be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of embodiments of the present disclosure and the way of attaining them can become apparent with reference to embodiments described below in detail in conjunction with the accompanying drawings. Embodiments, however, can be embodied in many different forms and should not be constructed as being limited to example embodiments set forth herein. Rather, these embodiments are provided so that this disclosure will be complete and will fully convey the scope of the present disclosure to those skilled in the art.

In the present disclosure, each of phrases such as "A or B", "at least one of A and B", "at least one of A or B", "A, B or C", "at least one of A, B and C", at Each of the phrases such as "at least one of A, B or C" and "at least one of A, B, C or combination thereof" can include any one or all possible combinations of the items listed together in the corresponding one of the phrases.

In the present disclosure, expressions of location relations used in the present specification such as "upper", "lower", "left" and "right" are employed for the convenience of explanation, and in case drawings illustrated in the present specification are inversed, the location relations described in the specification can be inversely understood accordingly.

Hereinafter, embodiments of the present disclosure will be described with reference to the accompanying drawings. A vehicle controlled by altitude prediction based on identification of a high-energy area according to an embodiment of the present disclosure is described with reference to FIGS. 1 and 2. FIG. 1 is a view illustrating a vehicle communicating with another device and transmitting and receiving data.

Referring to FIG. 1, a vehicle 100 can be driven on the basis of electric energy or fossil energy. The electric energy-based vehicle 100 of an embodiment can employ a pure battery-based vehicle driven only by a high-voltage battery and/or a gas-based fuel cell as an energy source, for example. In the case of a fuel cell, the vehicle 100 can charge a high-voltage battery by power generation of the fuel cell and execute various functions required by modules of the vehicle 100 with the output power of the high-voltage battery. In addition, the fuel cell can use various types of gas capable of generating electric energy, and the gas can be hydrogen, for example. However, the gas is not necessary limited hydrogen and various gases can be applicable. A fossil energy-based vehicle 100 can be driven by an internal combustion engine employing petroleum as an energy source, for example.

In an embodiment of the present disclosure, an example of the electric-energy vehicle being the fuel cell-based vehicle 100 will be described. However, embodiments and features of the present disclosure can be applied to any vehicle employing a method of charging a high-voltage battery in which a high-voltage battery and a cell are of different types can be applied. The cell can generate power to output power for starting, driving, and accessories of the vehicle 100, for example.

The vehicle 100 can refer to a mobile device. The vehicle 100 can be a conventional passenger or commercial vehicle, mobile office, or mobile hotel. The vehicle 100 can be a four-wheeled vehicle, such as a passenger car, an SUV, or a light truck, and can be a vehicle with more than four wheels, such as a bus, a large truck, a container carrier, a heavy vehicle, and the like. The vehicle 100 can be a manned or unmanned robot using a plurality of batteries, and can be, for example, a robot device for construction machinery. The vehicle 100 can be implemented by manual driving and/or autonomous driving (including semi-autonomous and fully autonomous driving).

Meanwhile, the vehicle 100 can communicate with other devices or other vehicles under the control of a communication control unit (CTU) mounted therein. Other devices can include, for example, a server 200 supporting various control, state management, and driving of the vehicle 100, an Intelligent Transportation System (ITS) device for receiving information from an ITS, various types of user devices, and the like.

The vehicle 100 can perform communication with other vehicles or other devices based on cellular communication, WAVE (Wireless Access in Vehicular Environment) communication, DSRC (Dedicated Short Range Communication) or short-range communication, other communication methods, or any combination thereof, for example.

For example, the vehicle 100 can use a cellular communication network such as an LTE or 5G communication network, a WiFi communication network, or a WAVE communication network, for communication with the server 200 and other vehicles. In addition, the DSRC used in the vehicle 100 can be used for communication between vehicles. The communication method between the vehicle 100 and other devices is not limited to the above-described embodiment.

The server 200 can transmit various information and software modules used to control the vehicle 100 to the vehicle 100 in response to requests and data transmitted from the vehicle 100. For example, the server 200 can provide the vehicle 100 with map information, road information, traffic information, and weather information necessary for driving. The map information can include elevation map information including altitude data corresponding to a 2D location along with map data expressed as the 2D location.

Examples of the elevation map information in an embodiment can include a numerical elevation map. The numerical elevation map can be created in the form of a map by measuring the altitude of the surface, not necessarily a human-made artifact. The numerical elevation map can use a DEM (digital elevation map) that can check the altitude of the corresponding ground point, and the ground point can be expressed in latitude and longitude. For example, the numerical elevation map can be published by recording a digital elevation through remote radiometry in NASA (USA), JAXA (Japan), and the like. NASA SRTM maps have a resolution of 90 m for the entire earth and are produced to have a resolution of 30 m for a specific area. JAXA AW3D30 maps are produced to have a resolution of 30 m for the entire earth. The numerical elevation map can be generated by referring to void area-related data of other maps, for areas where observation data such as altitude is absent, that is, void areas. The data of the numerical elevation map can be expressed by h(φ, λ) altitude (m), where φ and λ are latitude and longitude, respectively.

The numerical elevation map can be stored in the vehicle 100 or can be processed through compression for real-time transmission between the server and the vehicle, because it is massive data. In another example, the elevation map information might not include all of the elevations of the numerical elevation map, but can include a high-energy area described later and area information thereof. The high-energy area can be an area requiring a change in driving power control due to a gradient of a forward path, etc., and details of the area information will be described later. For convenience of description, the present disclosure illustrates transmission of map information including all altitude data of a numerical elevation map to the vehicle 100.

Figure 2:
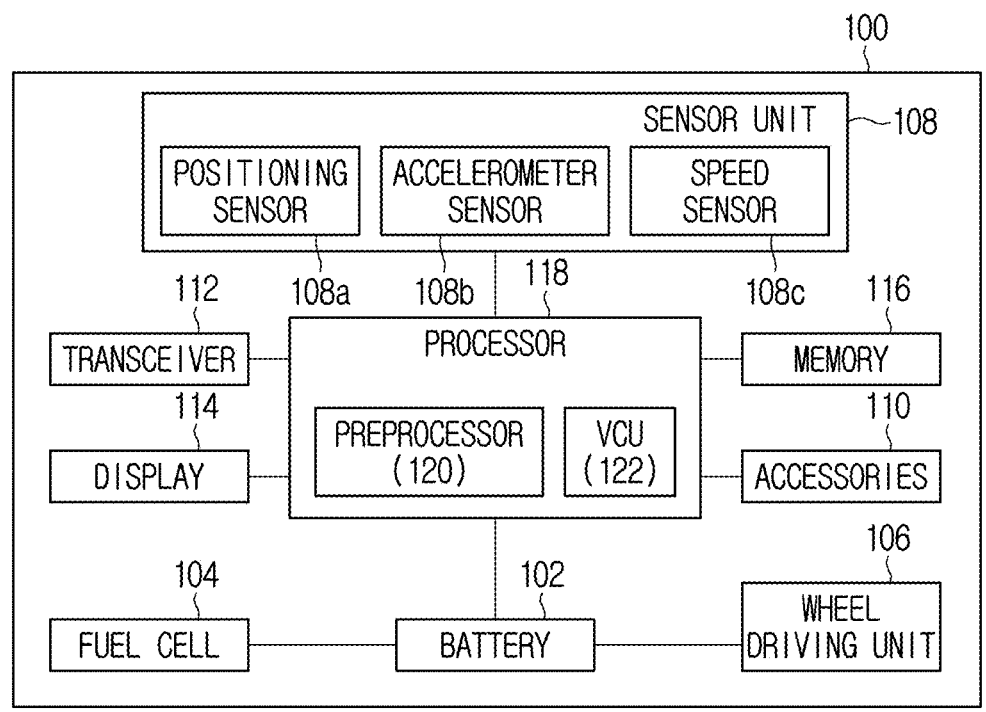
FIG. 2 is a view illustrating modules for configuring a vehicle according to an embodiment of the present disclosure.

FIG. 2 is a view illustrating modules configuring a vehicle according to an embodiment of the present disclosure. The vehicle 100 can include a battery 102, a fuel cell 104, and a wheel driving unit 106.

In an embodiment, the battery 102 can be charged by power generation of the fuel cell 104 and can supply necessary power to the modules of the vehicle 100. The battery 102 can be exemplified as a high-voltage battery composed of a secondary battery. The battery 102 can supply energy for starting and driving the vehicle 100 and operating accessories 110, for example. Specifically, the battery 102 can provide energy applied from the fuel cell 104 to starting, driving, air conditioning, and various electric devices of the vehicle 100. The battery 102 can output higher voltage than the fuel cell 104 to supply energy to, for example, the wheel driving unit 106 and a high-power electric module.

In an embodiment, the fuel cell 104 can include a hydrogen fuel cell that generates electric energy through a reaction between hydrogen supplied from a tank (not shown) and oxygen introduced from the outside (air). In addition, the fuel cell 104 can generate power by an amount of power determined based on power required for starting, driving, and the accessories 110, and charge the battery 102 with the generated power. In addition, the fuel cell 104 can supply energy to a low-power electric module mounted in the vehicle 100 according to design specifications. Hereinafter, the battery 102 and the fuel cell 104 are described as examples for convenience of description, but the present disclosure can be applied to the vehicle 100 operated only by the battery 102 charged by an external device except for regenerative breaking, without mounting the cell for charging the battery 102 in the vehicle 100, such as the fuel cell 104.

Although not shown, a converter is a module functioning as a booster, and can charge the battery 102 by converting the voltage from the fuel cell 104 and supplying the converted voltage to the battery 102. The converter can supply power with the converted voltage to the wheel driving unit 106 and various electronic devices operated in a high voltage range according to operating conditions. An electronic device can be, for example, accessories 110.

In an embodiment, the wheel driving unit 106 can be a module that receives power from the battery 102 and drives the wheel. The wheel driving unit 106 can include a motor unit and wheel units. For example, all of the wheel units can be connected to and driven by the motor unit. As another example, only some of the wheel units can be coupled to the motor unit, and the wheel unit not connected to the motor unit can be driven by the wheel unit driven by the motor. The wheel unit can include a wheel and a wheel brake module. The wheel brake module can be a module that decelerates the wheel by transmitting, to the wheel, a braking force according to a deceleration control request of a driver or the processor 118.

In an embodiment, the motor unit can receive power from the battery 102 and generate driving force. The motor unit transmits the driving force to the wheel unit, so that the wheel unit can be rotationally driven. The motor unit can include, for example, a motor that transmits the driving force to the wheel unit and a motor control module that controls motor torque, motor rotation direction, braking, and the like. The motor unit can be driven by receiving power applied from the battery 102 and passing through an inverter (not shown). The inverter can convert a specific form of power, e.g., alternating current, of the battery 102 into another form, e.g., direct current, and reduce the voltage. The inverter can convert a predetermined form of reverse power of the motor unit due to regenerative braking into a form suitable for the battery 102 and provide it to the battery 102.

In an embodiment, the vehicle 100 can include a sensor unit 108, accessories 110, a transceiver 112, a memory 116, and a processor 118.

In an embodiment, the sensor unit 108 can include various types of sensor modules for detecting various states and situations occurring in the environment inside and outside the vehicle 100. The sensor unit 108 can include, for example, a positioning sensor 108a, an accelerometer sensor 108b, and a speed sensor 108c.

In an embodiment, the positioning sensor 108a can measure the two-dimensional position and altitude of the vehicle 100 during driving to detect the position of the vehicle 100. The positioning sensor 108a can be, for example, a GPS sensor, a GNSS sensor, or the like. The GPS sensor can measure the location of the vehicle 100 based on information transmitted from a plurality of satellites. The positioning sensor 108a is not limited to the GPS sensor, and can be composed of multiple sensors combined with other sensors including the GPS sensor. The accelerometer sensor 108b can include a gyro sensor for detecting the posture and direction of the vehicle 100 and a 3-axis acceleration sensor. The accelerometer sensor 108b can estimate or measure the inclination of the vehicle 100 by a combination of the sensors. The speed sensor 108c can be composed of, for example, a wheel speed sensor connected to an electric brake system (EBS), and can measure vehicle speed.

Although not shown, the sensor unit 108 can include an image sensor, a lidar sensor, a laser sensor, a distance sensor, and the like. In the present disclosure, only the sensors referred to in the description of the embodiment are mainly described, and sensors for detecting various situations not listed herein can be additionally included.

In an embodiment, the accessories 110 can be an auxiliary device mounted in the vehicle 100 and consuming power supplied from the battery 102 by use of a passenger or user. The accessories 110 can be a type of electric device for non-driving except for a driving power system such as the wheel driving unit 106 in the present disclosure. The accessories 110 can be, for example, an air conditioning system, a lighting system, a seat system, an entertainment system, and various devices installed in the vehicle 100.

In an embodiment, the transceiver 112 can support mutual communication with the server 200, an adjacent vehicle, a roadside base station, a user device, or any combination thereof, for example.

In an embodiment, the transceiver 112 can transmit data generated or stored while driving to the server 200, and receive data and software modules transmitted from the server 200, under the control of the communication control unit (CTU). In an embodiment of the present disclosure, the vehicle 100 can receive map information including a numerical elevation map or information related to a high-energy area from the outside through the transceiver 112.

In an embodiment, the display 114 can function as a user interface. The display 114 can display, by the processor 118, an operation state of the vehicle 100, a control state, route/traffic information, a battery state, remaining gas amount information, content requested by a driver, and the like, for example. The display 114 can be composed of a touchscreen capable of detecting a driver's input and can receive a driver's request instructing the processor 118.

In an embodiment, the memory 116 can store applications for controlling the vehicle 100 and various data, and can load the applications or read or write data at the request of the processor 118. In an embodiment, the memory 116 can store map information including altitude data of an area of interest, identify a high-energy area based on the map information, and store an application and at least one instruction for controlling power, e.g., driving power, required for driving at a predicted altitude according to the identified high-energy area. Hence, the memory 116 can store and manage the numerical elevation map of the area of interest received from, for example, the server 200.

In addition, in an embodiment, the memory 116 can manage a reference altitude change used to distinguish the high-energy area and information used for driving power control, that is, area information of the high-energy area. The area information can include cluster information of each high-energy area and spot information related to high-energy spots belonging to the area. The cluster information can include, for example, a maximum altitude of a spot having maximum elevation, a minimum altitude of a spot having minimum elevation, and latitude and longitude ranges of the area among a plurality of spots belonging to the high-energy area. The spot information can include inclination data for each spot belonging to the high-energy area.

In an embodiment, the processor 118 can perform overall control of the vehicle 100. The processor 118 can be configured to execute applications and instructions stored in the memory 116. In connection with an embodiment, the processor 118 can use applications, instructions, and data stored in the memory 116 to identify high-energy spots based on map information including altitude data and a reference elevation change, clusters the high-energy spots to set a high-energy area and generate area information, and can perform driving power control based on at least the location information and area information of the vehicle 100 traveling or scheduled to travel in the high-energy area.

The processing can be performed in at least a portion of the processor 118, such as at least one processing module and a portion of the memory 130.

As another example, the processing can be performed in a plurality of processing modules and a memory built in each module, and the plurality of processing modules and the memory built therein can configure the processor 118 and the memory 116 according to an embodiment of the present disclosure.

For example, the plurality of processing modules can include individual processing modules that control each member of the vehicle 100 and upper processing modules that manage individual processing modules at a higher level. Specifically, identification and setting of high-energy spots and generation of area information can be preprocessing for driving power control, and the processor 118 can provide a preprocessor 120 as a software module that implements preprocessing. The upper processing modules that manage all of the aforementioned individual processing modules can be a vehicle control unit (VCU) 122. In an embodiment, the VCU 122 can predict forward gradient information of a forward path based on the high-energy region and area information generated by preprocessing, and can perform driving power control according to the predicted forward gradient information.

According to the foregoing, the preprocessor 120 and the VCU 122 can perform the respective processes, but in an embodiment of the present disclosure, for convenience of description, the processor 118 (including these processing modules identified) is described as performing identification and setting of the high-energy spots, generation of area information, and driving power control. Although the processor 118 is mainly described for the detailed processes for the above-described processing, the processing module in charge of the detailed processes can be clearly inferred from the above description. Accordingly, in an embodiment of the present disclosure, a processor can be a conceptual controller including a single or a plurality of processing modules.

The operations of the processor 118 (described above) for an exemplary embodiment will be described in detail with reference to FIGS. 3 to 10.

Figure 3:
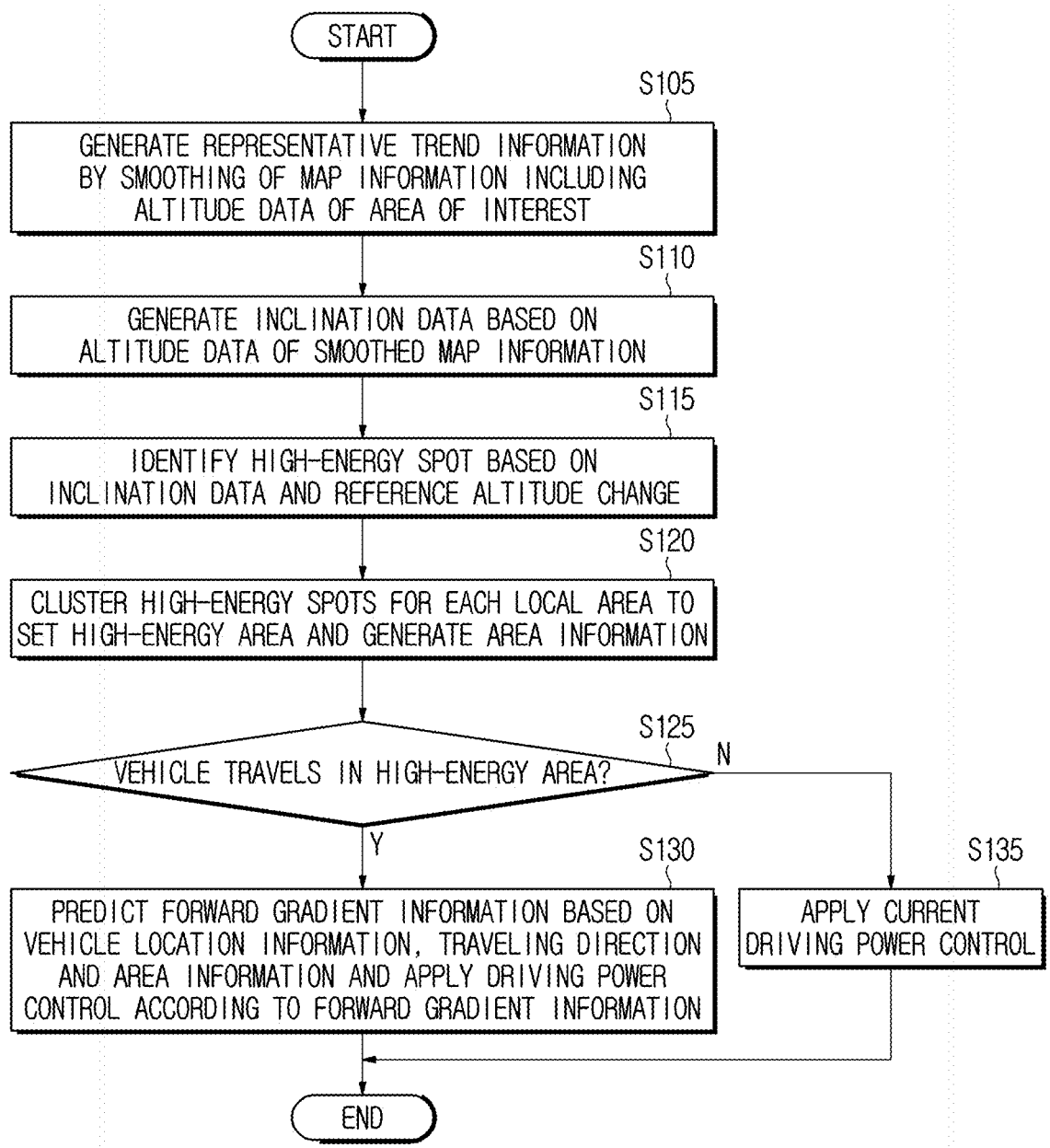
FIG. 3 is a flowchart illustrating a vehicle control method by altitude prediction based on identification of a high-energy area according to an embodiment of the present disclosure.

A method for controlling a vehicle by altitude prediction based on identification of a high-energy area according to an embodiment of the present disclosure will be described in detail with reference to FIG. 3. FIG. 3 is a flowchart illustrating a vehicle control method by altitude prediction based on identification of a high-energy area according to an embodiment of the present disclosure.

First, the processor 118 of the vehicle 100 can generate map information having representative trend information by a smoothing process of the map information received from the server 200 (operation S105).

The map information can include two-dimensional location data along with altitude data, such as numerical elevation maps. The two-dimensional location data can be composed of latitude and longitude. The map information can include latitude, longitude, and altitude for each detailed spot of the area of interest. In this example, Korea (South Korea) is exemplified as an area of interest.

A local altitude peak at a specific spot can cause all of the sequential charging and discharging of the battery 102, so that the effects of charging and discharging are cancelled and might not substantially affect the final state of charge of the battery. Therefore, because the local altitude change does not typically have an effective effect on the control of the electricized vehicle, a representative trend of the terrain of a wide area can be extracted.

The smoothing process can smooth the altitude data using a Gaussian filter based on a predetermined filter size, for example.

The Gaussian filter can be, for example, a 2D Gaussian filter used to remove invalid detailed altitude data and noise among altitude data recorded for each detailed spot of the area of interest.

A filter size can be determined based on a set unit distance according to output performance of an energy source module providing driving power and the resolution of the numerical elevation map. The energy source module can be, for example, the fuel cell 104 and/or the battery 102 that supplies power to the modules of the vehicle 100. The filter size can be defined by, for example, the output performance and capacity of the battery 102, the output level of the fuel cell 104, and the like.

If the capacity of the battery 102 is large and the output of the fuel cell 104 is high, it might be sufficient to consider only trends in a wide area in the map data. On the other hand, if the capacity of the battery 102 is small or the output of the fuel cell 104 is small, even a trend in a narrower area can be considered. In an embodiment of the present disclosure, a set unit distance D for defining a filtering size can be set to about 10 km, and filtering can be performed. In the case of a numerical elevation map with resolution of 90 m, an actual filter size $f_{size}$ can be determined as follows. Specifically, the filter size can be calculated as $$f_{size} = \frac{D}{90 \text{ m}} = \frac{10 \times 10^3}{90} \cong 111.$$

For a numerical elevation map with resolution of 30 m, the filter size can be determined by $$f_{size} = \frac{D}{30 \text{ m}} = \frac{10 \times 10^3}{30} \cong 333.$$

Figure 4:
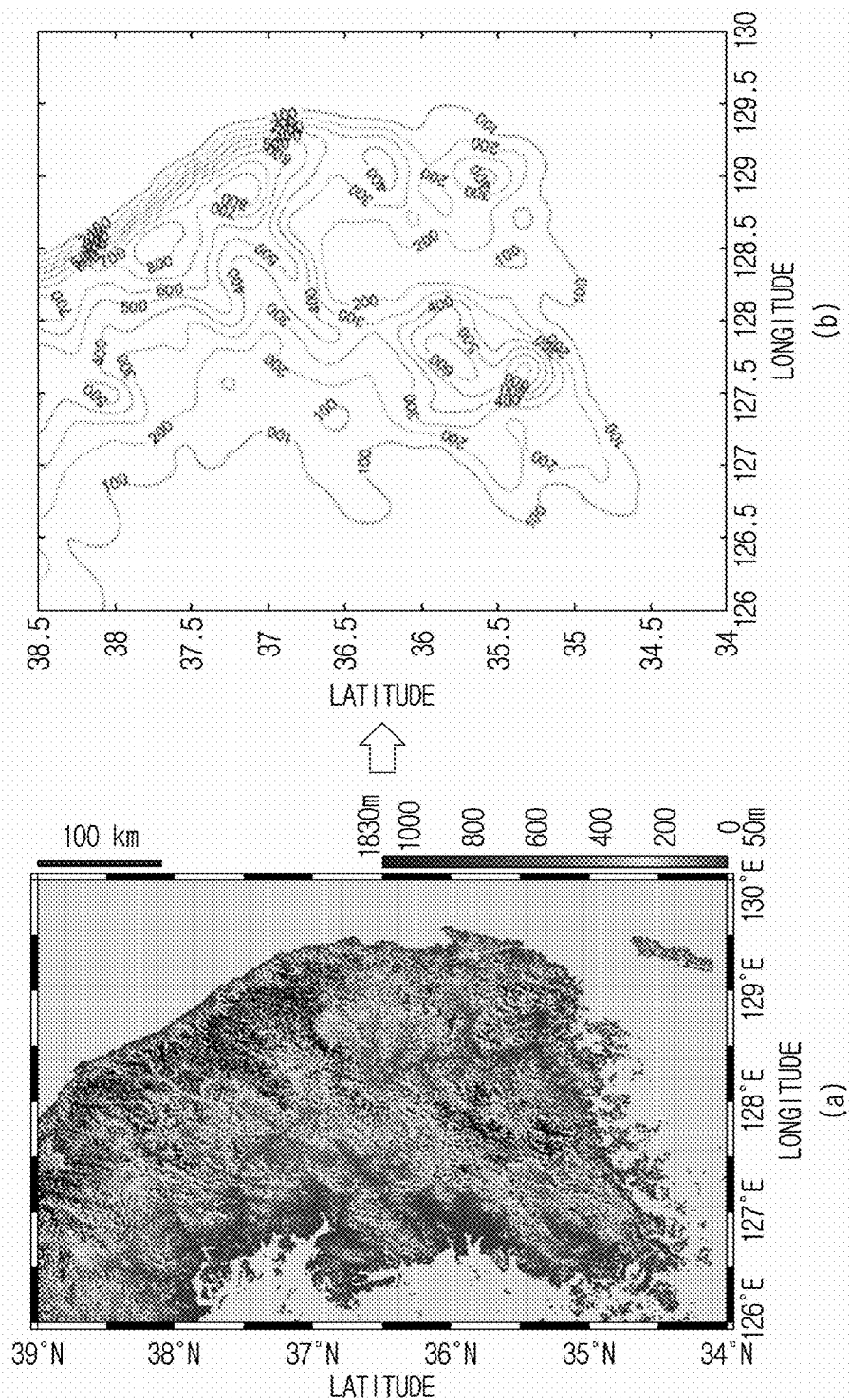
FIG. 4 is a view illustrating a smoothing process of map information including altitude data, according to an embodiment of the present disclosure.

In addition, the filtered altitude h'(φ, λ) can be obtained as gauss_2d(h(φ, λ), $f_{size}$) through a 2D Gaussian filter having a defined filtering size. A process of extracting representative trend information related to altitude data in an area of interest by applying a 2D Gaussian filter to map information can be illustrated as in FIG. 4. More specifically, FIG. 4 is a view illustrating a smoothing process of map information including altitude data. And, FIG. 4 shows representative trend information obtained by applying a filter size of 10 km to the altitude data of the map information in which Korea is selected as an area of interest.

Subsequently, the processor 118 can generate inclination data based on the altitude data of the smoothed map information (operation S110 in FIG. 3).

In an embodiment, the inclination data can be described as a gradient vector field, for example. The gradient vector field represents a degree to which the filtered altitude h'(φ, λ) at each spot of the smoothed map information changes in the latitude and longitude directions, respectively, and can be calculated as in Equation 1.

$$\vec{\nabla} h' = \frac{dh'}{d\phi}\hat{\phi} + \frac{dh'}{d\lambda}\hat{\lambda} \quad \text{[Equation 1]}$$

where, $\hat{\phi}$ and $\hat{\lambda}$ are respectively unit vectors in the latitude and longitude directions, and $$\frac{dh'}{d\phi}, \frac{dh'}{d\lambda}$$

can be calculated by a finite differencing method.

In an embodiment, to create the gradient vector field, latitude and longitude can be discretized. Specifically, matters related to latitude can be expressed as $\vec{\phi} = [\phi_1\ \phi_2\ \ldots\ \phi_N]$ and $\delta\phi = \phi_{i+1} - \phi_i$. Matters related to longitude can be expressed as $\vec{\lambda} = [\lambda_1\ \lambda_2\ \ldots\ \lambda_N]$ and $\delta\lambda = \lambda_{i+1} - \lambda_i$. In an embodiment, a discretized δφ and δλ of the gradient vector field can be set to δφ=δλ=D=10 km. Accordingly, the inclination data can have a magnitude corresponding to the gradient distance along with the gradient direction of the uphill or downhill.

Next, in an embodiment, the processor 118 can extract a high-energy spot based on the altitude data of the map information and the reference altitude change in order to identify a high-energy area of the map information corresponding to an altitude that causes an effective change in driving power control (operation S115 in FIG. 3).

Because the altitude data of the map information is converted into inclination data in the latitude and longitude direction in operation S110, a high-energy spot can be extracted based on the inclination data and the reference altitude change.

In an embodiment, the reference altitude change can be defined as an altitude change requiring a change in a driving power control plan applied to the current driving of the vehicle 100. The defined altitude change can be an altitude difference value that determines that driving power (ΔE; or driving energy) expected when the vehicle 100 moves by a set unit distance (ΔD) at a predetermined speed (v) is greater than reference power consumption. The set unit distance can be the same as a unit distance used to determine the filter size described above.

The reference altitude change can be defined by specifications of the vehicle 100, driving state data, and the like. The reference altitude change can be calculated by physical quantities such as specifications and driving states, as exemplified in Table 1 below.

TABLE 1

| parameter | Physical quantity (meaning) | Example value |
|---|---|---|
| $\tau_{mot}$ | Motor torque | — |
| $g_{gbx}$ | Gear ratio | 0.7 |
| $g_{axle}$ | Axle reduction ratio | 4.875 |
| $\varepsilon_x$ | Efficiency of system x | 0.97 for mot, axle, gbx |
| $r_{tire}$ | Dynamic radius of tire | 0.497 m |
| M | Weight of loaded vehicle | 25000 kg |
| $C_d$ | Aerodynamic coefficient | 0.475 |
| A | Area of vehicle | 7.5 m |
| v | Constant speed | 90 kph or 25 mps |
| ρ | Atmospheric density | 1.19 |
| μ | Rolling resistance coefficient | 0.01 |
| $F_{air}$ | aerodynamics | 1325 N |
| $E_{tot}$ | Battery power | 72 kWh |
| ΔSOC* | SOC change reference per movement distance | 50% |
| ΔE* | Battery discharge power reference | 36 kWh |
| ΔD | Movement distance | 30 km |
| Δt | Movement time | 1200 s |
| $P_{FC}$ | Continuous output of fuel cell | 120 kW |
| $P_{aux}$ | Continuous output upper limit of accessories | 30 kW |
| $\frac{dE}{dt}$ | Battery discharge power | — |

Assuming that the vehicle passes through the uphill gradient at high constant speed, in an embodiment, the following relationship can be established between the torque of the power-train related to the wheel driving unit 106 and drive resistance. The relational expression can be $$\frac{g_{gbx}g_{axle}}{r_{tire}}\tau_{mot} = \frac{1}{\varepsilon_{gbx}\varepsilon_{axle}}\left[\frac{1}{2}C_a\rho Av^2 + Mg(\mu\cos(\theta) + \sin(\theta))\right].$$

Here, μ=0.01, small angle approximation can be applied, and both sides can be multiplied by the constant speed and divided by the electric efficiency of the motor, and the relational expression can be converted into an expression for power as follows. The expression for power can be $$P_{res}(\theta) = \frac{v}{\varepsilon_{mot}\varepsilon_{gbx}\varepsilon_{axle}} \left[\frac{1}{2}C_a\rho Av^2 + Mg(0.01 + 0.99\theta)\right],$$

where $P_{res}$ is actual power consumption of the motor required to cancel the drive resistance.

For power, a correlation expression described as $$P_{FC} - P_{aux} - P_{res}(\theta) = -\frac{dE}{at} = -\frac{\Delta E}{(\Delta D/v)}$$

can be established. Meanwhile, through the values of v, $\Delta D$, $E_{tot}$, $\Delta SOC^*$ illustrated in Table 1, the power defining the high-energy area reference can be defined as follows. Specifically, $$\left.\frac{dE}{dt}\right|_{H.E.} = \frac{\Delta E^*}{(\Delta D/v)} = \frac{E_{tot} \cdot \Delta SOC^*}{(\Delta D/v)} = 108 \text{ kW}.$$

Therefore, by utilizing the above expression, $\theta_{H.E.}$ is obtained, and $\theta_{H.E.}=0.0142$. On the other hand, the reference altitude change $\Delta h_{critical}$ per set unit distance D (10 km) corresponding to the inclination angle can be defined as follows. Regarding the reference altitude change, $\Delta h_{critical}=D\cdot\tan(\theta_{H.E.})\approx\theta_{H.E.}D=142$ m can be set.

In an embodiment, the processor 118 can determine whether each spot corresponds to a high-energy spot based on a set unit distance and inclination data of each spot, for example, an altitude change and a reference altitude change according to a gradient vector field.

In an embodiment of the present disclosure, $\delta\phi=\delta\lambda=D=10$ km can be set for the discretized $\delta\phi$ and $\delta\lambda$ of the gradient vector field. Accordingly, identification of the high-energy spot can be performed by Equation 2. Here, the reference altitude change $\Delta h_{critical}$ can be 142 m per set unit distance of 10 km according to the above points.

$$\nabla h'(\phi_i, \lambda_j) = \begin{cases} \nabla h'(\phi_i, \lambda_j), \|\nabla h'(\phi_i, \lambda_j)\| \geq \frac{\Delta h_{critical}}{10 \text{ km}} \\ 0, \|\nabla h'(\phi_i, \lambda_j)\| < \frac{\Delta h_{critical}}{10 \text{ km}} \end{cases} \quad \text{[Equation 2]}$$

Figure 5:
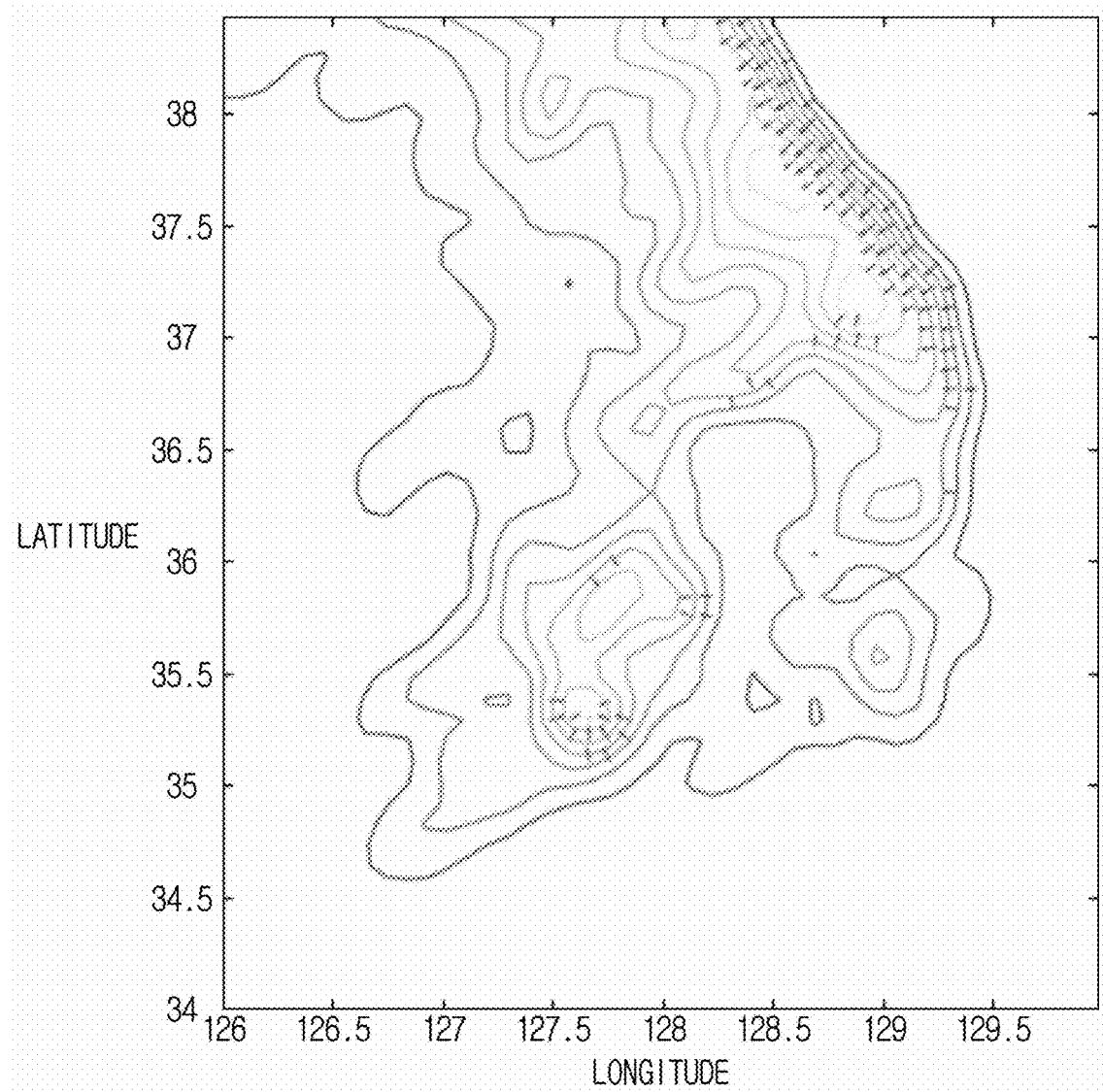
FIG. 5 is a view illustrating inclination data recorded at a high-energy spot, according to an embodiment of the present disclosure.
Figure 6:
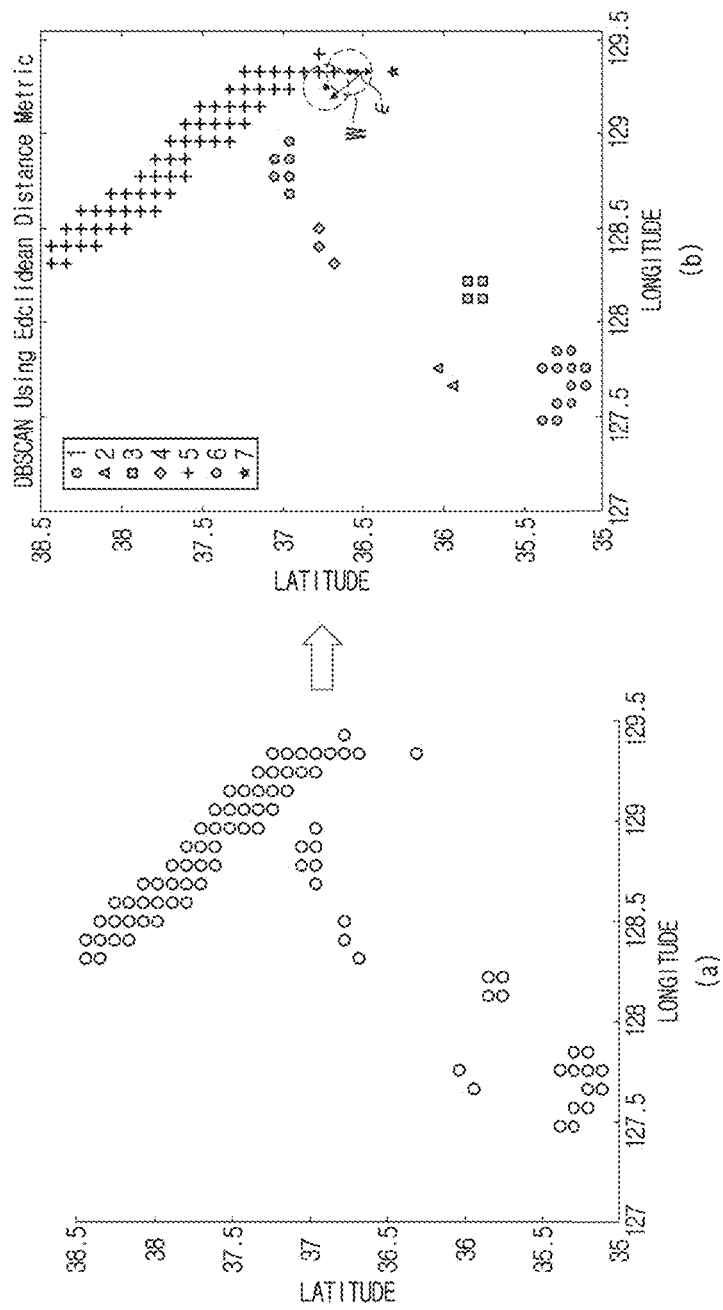
FIG. 6 is a view illustrating an example of a process of clustering high-energy spots, according to an embodiment of the present disclosure.

As in Equation 2, when the altitude change at the spot extracted as the representative trend information is greater than or equal to the reference altitude change, the spot can be determined to be a high-energy spot, and the gradient vector field of the determined spot can be recorded. On the other hand, if the altitude change of the spot is smaller than the reference altitude change, the spot can be determined to be a low-energy spot, not a high-energy spot, and the gradient vector field of the determined spot can be recorded as "o" to be excluded. The gradient vector field of the high-energy spot extracted as a result of performing operation S115 is illustrated in FIG. 5, and the high-energy spot can be represented as shown in the left side of FIG. 6. FIG. 5 is a view illustrating inclination data recorded at a high-energy spot. FIG. 6 is a view illustrating an example of a process of clustering high-energy spots. Taking a location in Korea as an example, 85 high-energy spots can be extracted.

Next, the processor 118 can cluster high-energy spots for each area to set a high-energy area and generate area information (operation S120 in FIG. 3).

In an embodiment, clustering of high-energy spots can be implemented by grouping high-energy spots within a movement window W that are successively detected by the movement window W employing a selected/set radius ϵ, as illustrated in the right side of FIG. 6. The radius ϵ can be set larger than the above-described set unit distance D, and can be designated as 1.5D, for example. The set unit distance D can be determined based on output performance of an energy source module, for example, the battery 102 and/or the fuel cell 104. A shift of the movement window W can move the movement window to include the previously detected high-energy spot in the movement window.

As illustrated in the right side of FIG. 6, the processor 118 can check whether a new high-energy spot is included in the shifted movement window W in addition to the preceding high-energy spots. As shown in FIG. 6, the processor 118 can cluster the two high-energy spots into a single high-energy area when checking the presence of a new high-energy spot in the shifted movement window W. Until no new high-energy spot is detected in the shifted movement window W, the processor 118 can repeatedly shift the movement window W and check the presence of the high-energy spot. If a new high-energy spot is not searched for, the processor 118 can group all of the high-energy spots detected by repetitively shifting the window W as spots in a high-energy area distinguished from other areas.

Subsequently, in an embodiment, the processor 118 can perform shift of the movement window W from a high-energy spot estimated as the local areas different from the designated high-energy area and detection of the high-energy spot.

In an embodiment, clustering of high-energy spots according to the foregoing can be referred to as Density-Based Spatial clustering of applications with noise (DB-SCAN) technique, for example. The setting of high-energy areas can be performed by performing clustering of high-energy spots for each local area using DBSCAN. Because the number of clusters might not be designated in advance, DBSCAN can be suitably used in situations where it is difficult to recognize the number of high-energy areas in advance.

In the case of DBSCAN illustrated in FIG. 6, clustering can be performed based on the radius ϵ of the movement window W and the minimum detection number $N_{min}$ parameters within the movement window W for determining whether or not the same cluster is present. In an embodiment of the present disclosure, because noise can be removed in advance through Gaussian filtering and a gradient field vector can be obtained for each set unit distance D, DBSCAN can be performed by $\epsilon=1.5D\approx0.134°$ and $N_{min}=1$. Taking Korea as an example, it is confirmed that high-energy areas can be identified as shown in the right side of FIG. 6.

When all high-energy areas are set, area information of each high-energy area can be generated and stored in the memory 116. The area information can include cluster information of a high-energy area and spot information of a high-energy spot belonging to the high-energy area. The cluster information can include, for each high-energy area, a maximum altitude, a minimum altitude, and latitude and longitude ranges constituting the boundary of the high-energy area. The spot information can include inclination data for each high-energy spot, and the inclination data can include, for example, a gradient vector field as illustrated in FIG. 5.

Taking Korea as an example, the area information can include information corresponding to seven high-energy areas, as illustrated in FIG. 7. FIG. 7 is a view illustrating tabulated area information of a high-energy area. In FIG. 7, cluster information of each high-energy area composed of the maximum altitude (Min. Alt.), the minimum altitude (Max. Alt.), and the latitude and longitude displacement corresponding to the boundary of the high-energy area (Min. Lat. Max. Lat., Min. Lon. Max. Lon.) is tabulated.

In an embodiment, the spot information can be configured to have the latitude and the longitude corresponding to each high-energy spot, a vector element value $$\frac{dh'}{d\phi}$$

according to the latitude, and a vector element value $$\frac{dh'}{d\lambda}$$

according to the longitude. To compress the gradient vector field data of the high-energy area, the inclination data can be managed in the form of a table, and $$\frac{dh'}{d\phi}$$

and $$\frac{dh'}{d\lambda}$$

can be stored in the unit of $$\frac{m}{D\,km}.$$

D can be the aforementioned set unit distance.

Taking Korea as an example, about 5401×4801=2.7×10$^7$ pieces of altitude data express the entire altitude of Korea based on a DEM with a resolution of 90 m. When a method according to an embodiment, in which the set unit distance D and the reference altitude change are set to 10 km and 142 m, respectively, are applied to Korea, the high-energy spots can be classified into 85 spots, and the number of detailed variables of the inclination data constituting the spot information of each spot can be four (latitude, longitude, and vector element values according to latitude and longitude directions), and a total number of pieces of spot information can be 340 (=85×4). In addition, because there are seven high-energy areas and six detailed data of cluster information as illustrated in FIG. 7, a total number of pieces of cluster information can be 42 (=7×6). Accordingly, the area information can be stored in the memory 116 as a total of 382 data values (=340+42).

Accordingly, in an embodiment, it is possible to predict the altitude in the high-energy area of the vehicle 100 with only about 0.0015% of the original data by identifying the trend of the terrain and ignoring the low-energy terrain through Gaussian filtering.

Figure 8:
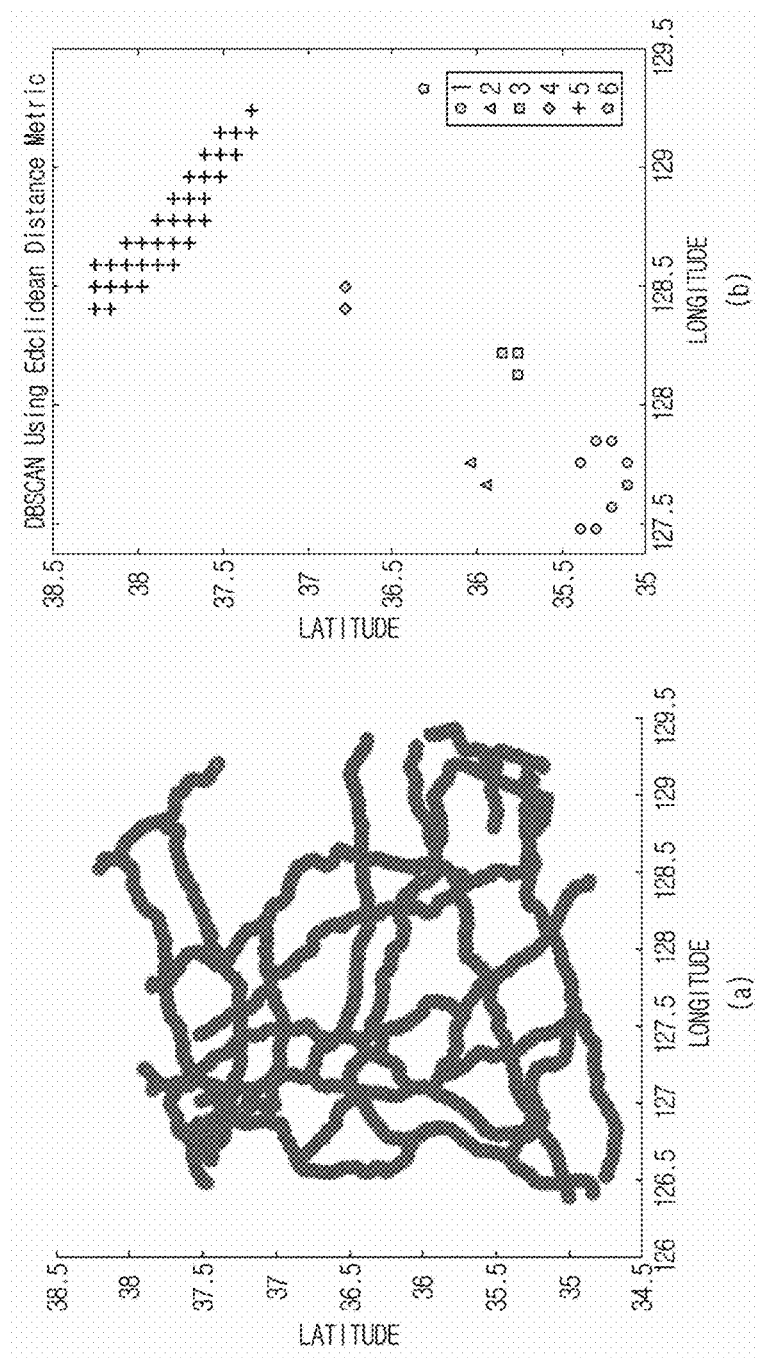
FIG. 8 is a view illustrating another example of a process of clustering high-energy spots, according to an embodiment of the present disclosure.

FIG. 8 is a view illustrating another example of a process of clustering high-energy spots. The embodiment of FIG. 8 can be a modified example of operation S115 of FIG. 3. The embodiment of FIG. 8 shows generation of area information as well as setting of a clustered high-energy area mainly on restricted roads by limiting drivable roads according to the type of the vehicle 100.

In a manner similar to operation S115 of FIG. 3, a preliminary high-energy spot can be selected based on the inclination data obtained in operation S110 and the above-mentioned reference altitude change. Next, the processor 118 can determine a road type to be applied according to the type of the vehicle 100. For example, when the vehicle 100 is a special-purpose vehicle such as a trailer truck, the vehicle 100 can operate on a road of a specific category, for example, a highway. Subsequently, the processor 118 can check a road that matches the road type determined based on the road information as illustrated in the left side of FIG. 8, and determine a preliminary high-energy spot related to the checked road as a high-energy spot as shown in the right side of FIG. 8. Specifically, if the distance from the center line of the checked road (e.g., highway) is limited to a high-energy spot within a search range, for example, a set unit distance D, additional removal of unnecessary high-energy spots can be performed, thereby expressing a high-energy area with a smaller number (50) of spots. In the case of this example location in Korea, if it is limited to the vicinity of the highway, about 41% (35/85) spots among all (85) high-energy spots illustrated in FIG. 6 can be removed. Subsequently, in a manner similar to operation S120, in an embodiment, the processor 118 can set a high-energy area by clustering high-energy spots for each area and generate area information. As illustrated in the left side of FIG. 8, the number of high-energy areas is six, which can be determined to be less than the number (7) of high-energy areas of FIG. 6.

Referring to FIG. 3 again, in an embodiment, the processor 118 can determine whether the vehicle 100 travels in the high-energy area (operation S125).

Figure 9:
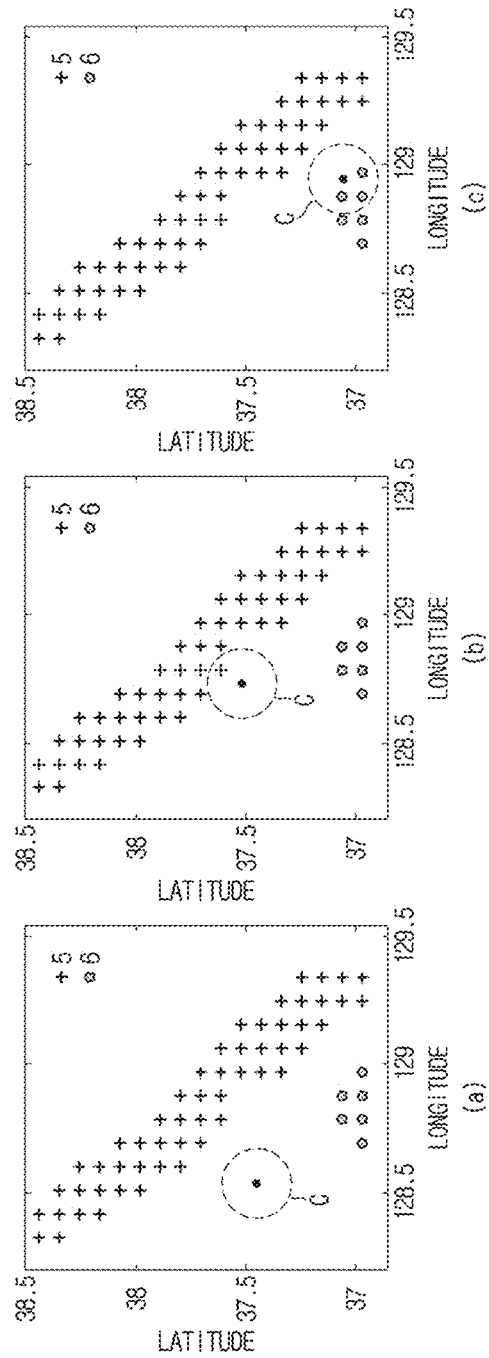
FIG. 9 is a view illustrating determining whether a vehicle travels in a high-energy area and determining a high-energy area where the vehicle travels, according to an embodiment of the present disclosure.

FIG. 9 is a view illustrating determining whether a vehicle travels in a high-energy area and determining a high-energy area where the vehicle travels.

In an embodiment, the processor 118 can match the current location information of the vehicle 100 through the positioning sensor 108a with the area information of the high-energy area to determine whether the vehicle travels in the high-energy area and identify a specific high-energy area in which the vehicle travels. The current location information can include latitude, longitude, and altitude of the vehicle 100. The location of the vehicle 100 that matches the high-energy area can be, for example, a latitude and longitude value. As another example, a search range C can be set to have a selected/set radius centered on the vehicle 100 to match area information of the high-energy area, as illustrated in FIG. 9. The radius of the search range C can be set to, for example, 1.5D (1.5 times the set unit distance).

As illustrated on the left side of FIG. 9, even if the vehicle 100 belongs to the latitude and longitude range (part of the cluster information) of the high-energy area 5, if information on any spot in the high-energy area 5, for example, inclination data of the spot does not belong to the search range C of the vehicle 100, it can be determined that the vehicle 100 does not travel in the high-energy area 5. As in the central side of FIG. 9, when the vehicle 100 enters the latitude and longitude range of the high-energy area 5 and some of the spot information of the high-energy area 5 belongs to the search range C of the vehicle 100, it can be determined that the vehicle 100 travels in the high-energy area 5. As shown in the right side of FIG. 9, even if the vehicle 100 belongs to the latitude and longitude range of high-energy areas 5 and 6, when only the spot information of high-energy area 6 belongs to the search range C, it can be determined that the vehicle 100 travels in the high-energy area 6.

In an embodiment, when the vehicle 100 travels in the high-energy area, the processor 118 can perform driving power control based on at least location information of the vehicle 100 and area information of a high-energy area into which the vehicle 100 has entered (operation S130 of FIG. 3).

In an embodiment, driving power control can be established according to a plan changed based on area information, without applying a plan based on driving power control maintained until current driving.

In the case of an electric energy-based vehicle, driving power control can, for example, include a battery charging state, a fuel cell power generation control plan based on the predicted altitude change direction and amount according to the altitude rising/lowering, etc., an output/consumption reduction plan of the battery 102 before entering the high-energy spot, accessory power consumption for regenerative braking, and the like. The output/consumption reduction plan of the battery 102 can be, for example, minimization of the amount of power consumed by the accessories 110 and limitation of the maximum vehicle speed. In the case of a fossil fuel-based vehicle, driving power control can be, for example, establishment of a fuel consumption plan such as limitation of the maximum vehicle speed according to the amount of fuel based on fossil fuel.

In an embodiment, the processor 118 can predict the upper and lower limits of the altitude applied to the vehicle 100 to be driven in the corresponding high-energy area through area information (e.g., cluster information) of the high-energy area, to which the vehicle 100 belongs, and the current location of the vehicle through the positioning sensor 108*a*. In an embodiment, the maximum altitude and minimum altitude can be used to adjust the SOC target of the battery 102, and over-discharge or over-charge of the battery 102 can be prevented.

For example, if the vehicle 100 enters the high-energy area 5 and the current altitude of the vehicle 100 is 800 m, the maximum altitude is 850 m and thus raisable altitude can be 25 m. The droppable altitude can be 700 m. The processor 118 can operate the fuel cell 104 to control the battery 102 in a discharge-oriented manner in consideration of the current altitude and the raisable/droppable altitude. Accordingly, overcharging can be prevented.

On the other hand, if the current altitude of the vehicle 100 is 100 m in the high-energy area 5 into which the vehicle 100 has entered, because the possibility of rise of the altitude is estimated, the fuel cell 104 can be operated to control the battery 102 in a charging-oriented manner. Accordingly, over-discharge can be suppressed.

In addition, in an embodiment, the processor 118 can predict forward gradient information of a route to be traveled based on the traveling direction of the vehicle 100 along with the area information of the high-energy area into which the vehicle 100 has entered and the location information of the vehicle 100. The traveling direction can be detected by, for example, a location history tracked by driving up to now and/or a sensor value of the accelerometer sensor 108*b*. The route to be traveled can be a specific high-energy spot in the high-energy area into which the vehicle has entered. The forward gradient information can be forward altitude related information established based on spot information of a high-energy spot into which the vehicle will enter. Forward altitude related information can include, for example, a gradient direction such as uphill/downhill, a gradient distance, a road inclination angle, and the like. Thus, in an embodiment, the processor 118 can perform driving power control based on the predicted forward gradient information.

In the case of an electric energy-based vehicle, driving power control can be performed to control the battery 102 according to a charging- or discharging-oriented power plan based on forward gradient information and state information of the battery 102. A power plan can include determining a target charging state of the battery 102 and controlling charging or discharging suitable for the determined target. The charging-oriented power plan can include, for example, a power generation control plan of the fuel cell 104 for charging the battery 102. The discharging-oriented power plan can include an output/consumption reduction plan of the battery 102 before entering a high-energy spot, power consumption of accessories for regenerative braking, and the like.

Figure 10:
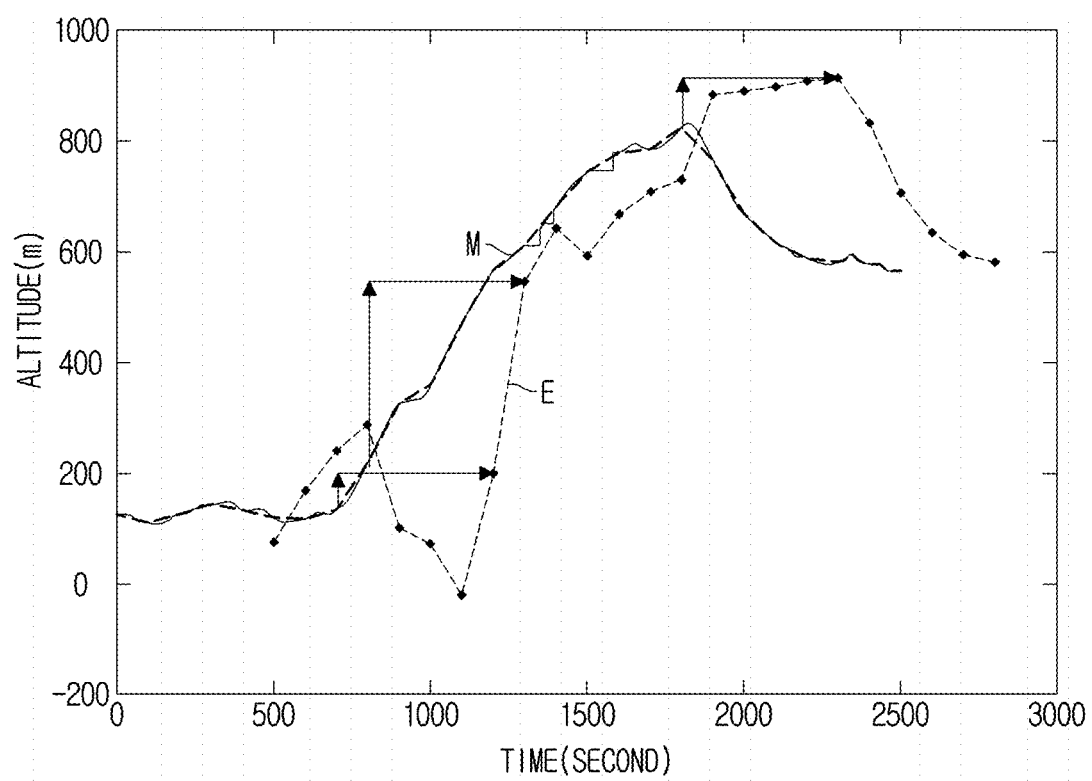
FIG. 10 is a view illustrating driving power control according to forward gradient information of a route to be traveled in a vehicle traveling in a high-energy area, according to an embodiment of the present disclosure.

FIG. 10 is a view illustrating driving power control according to forward gradient information of a route to be traveled in a vehicle traveling in a high-energy area, according to an embodiment of the present disclosure. In FIG. 10, line E is a predicted altitude generated according to an embodiment, for an actual road in the high-energy area 5, and line M is an actually measured altitude of the actual road.

As a result of simulating terrain-based altitude prediction for an actual road corresponding to the representative high-energy area 5 of FIGS. 6 and 7, when the vehicle 100 travels along a road perpendicular to the gradient vector, the altitude range of the high-energy area can be recognized to be [86.0, 825.0]. The vehicle 100, which is currently driven at a low altitude, predicts that there is only a possibility of rise of the altitude and operates the fuel cell in a charging-oriented manner.

When the vehicle 100 enters the road at a specific high-energy spot in the high-energy area 5, the traveling direction of the vehicle 100 is substantially identically aligned with the direction of the gradient vector at the specific spot, so that a rapid rise of the altitude can be predicted. As illustrated in FIG. 10, the processor 118 of the vehicle 100 can perform predictive control of the fuel cell starting from 500 seconds before, unlike the above situation, that is, the situation of traveling along a road perpendicular to the gradient vector, thereby minimizing the amount of SOC degradation of battery 102. In addition, it can be expected that the traveling distance of the vehicle 100 is rapidly reduced.

In an embodiment, the vehicle 100 can predict that the current altitude is maintained in a section with little altitude change. In FIG. 10, the prediction error can be at the level of 100 m, but the power control applied to the current driving can be maintained and applied.

The traveling direction of the vehicle 100 can be extracted based on a history of the location moved according to driving and/or the value of the accelerometer sensor 108*b*, and, for driving power control, the current driving direction and speed can be assumed to be constant for a specific time. In addition, the gradient vector of the current vehicle position can be calculated by two-dimensional interpolation of gradient vector field data.

If route integration is performed based on the above assumption, altitude prediction after certain k (=5) steps can be performed through the following equations. The above equation is can be $\vec{p}_i = \vec{p}(t_0) + \vec{v}(t_0) \cdot (t_i - t_0)$, where $\delta t = t_{i+1} - $ $t_i$=100 s, and i=0, 1, ..., k, $\vec{p}_i$ can be a predicted position. The altitude after the certain k step are predicted by $\Delta h_{pred} = \sum_{i=1}^{k} \nabla h'(\vec{p}_{i-1} \cdot \hat{\phi}, \vec{p}_{i-1} \cdot \hat{\lambda}) \cdot \delta l$, where $\delta l = |\vec{v}(t_0)| \cdot \delta t$ (set unit distance D km or less), k can be the number of prediction steps.

Referring to FIG. 3 again, in an embodiment, upon determining that the vehicle 100 does not travel in the high-energy area, the processor 118 can maintain the current driving power control and apply it to the battery 102 and/or the fuel cell 104 (operation S135).

In the present disclosure, it is mainly described that the area information of the high energy area is generated and utilized by the processor 118 of the vehicle 100. When the area information is stored in the vehicle 100 for memory efficiency, map information including a numerical elevation map can be deleted. As another example, the numerical elevation map is not transmitted to the vehicle 100, the server 200 can generate area information and transmit it to the vehicle 100, and the vehicle 100 can perform driving power control based on the received area information.

According to an embodiment of the present disclosure, it is possible to provide a vehicle control method capable of identifying a substantial high-energy area in an area of interest and implementing driving power control suitable for the area.

According to an embodiment of the present disclosure, by extracting a substantial high-energy area from an area of interest and managing high-energy area-oriented information, altitude data required for driving can be managed with a small amount of data without storing the altitude data of the entire area of interest, thereby supporting driving power control.

It can be appreciated by persons skilled in the art that that the effects that can be achieved through an embodiment of the present disclosure are not limited to what has been particularly described and other advantages of an embodiment of the present disclosure can be more clearly understood from the detailed description.

While the exemplary methods of the present disclosure described above are represented as a series of operations for clarity of description, it is not intended to necessarily limit the order in which the steps are performed, and the steps can be performed simultaneously or in different order as necessary/desired. To implement a method embodiment of the present disclosure, the described steps can further include other steps, can include remaining steps except for some of the steps, or can include other additional steps except for some of the steps.

The various embodiments of the present disclosure are not a list of all possible combinations and are intended to describe representative features and advantages of the present disclosure, and the matters described in the various embodiments can be applied independently or in combination of two or more.

In addition, various embodiments of the present disclosure can be implemented in hardware, firmware, software, or a combination thereof. In the case of implementing an embodiment by hardware, it can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, or combinations thereof, for example.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for controlling a vehicle, the method comprising:
    identifying a first high-energy spot based on a reference altitude change and map information including altitude data;
    clustering high-energy spots based on the first high-energy spot to set a high-energy area and generating area information; and
    performing driving power control based on at least location information of the vehicle and the area information in response to a vehicle travel path including the high-energy area,
    wherein clustering the high-energy spots comprises adding a second high-energy spot into the high-energy area, and
    wherein the second high-energy spot is located in a selected radius from the first high-energy spot.

2. The method of claim 1, further comprising generating the map information comprising representative trend information, wherein the representative trend information is generated based on a smoothing process of the map information.

3. The method of claim 2, wherein the smoothing process comprises smoothing the altitude data using a Gaussian filter based on a selected filter size, wherein the filter size is determined based on a unit distance set according to an output performance of an energy source module providing driving power.

4. The method of claim 1, wherein the reference altitude change is defined as an altitude change prompting a change in plan of the driving power control applied to current driving of the vehicle, and the altitude change is an altitude difference value in which driving power to be consumed when the vehicle moves by a set unit distance at a selected speed is determined to be greater than reference power consumption.

5. The method of claim 1, wherein identifying the first high-energy spot comprises:
    selecting a preliminary high-energy spot based on the map information and the reference altitude change;
    determining a road type applied according to a type of the vehicle; and
    determining the preliminary high-energy spot related to a road belonging to the road type as the first high-energy spot.

6. The method of claim 1, further comprising:
    generating inclination data based on altitude data of the map information before identifying the first high-energy spot,
    wherein identifying the first high-energy spot comprises extracting the first high-energy spot based on the inclination data and the reference altitude change, and
    wherein the area information comprises cluster information of the high-energy area and spot information of the first high-energy spot belonging to the high-energy area.

7. The method of claim 6, wherein the cluster information comprises a maximum altitude, a minimum altitude, and latitude and longitude ranges of the high-energy area, and wherein the spot information comprises inclination data for each high-energy spot.

8. The method of claim 1,
wherein clustering of the first high-energy spot comprises grouping high-energy spots within a movement window detected by the movement window using the selected radius,
wherein the selected radius is set greater than a set unit distance based on output performance of an energy source module providing driving power, and
wherein a shift of the movement window is moving the movement window to include the first high-energy spot previously detected within the movement window.

9. The method of claim 1, wherein performing the driving power control comprises:
predicting forward gradient information of a route to be traveled based on a traveling direction of the vehicle along with the location information of the vehicle and the area information; and
performing the driving power control based on the predicted forward gradient information.

10. The method of claim 9, wherein the vehicle comprises an electric energy-based energy source module, and the driving power control is performed to control the energy source module according to a charging-oriented or discharging-oriented power plan based on state information of the energy source module and the forward gradient information.

11. A vehicle comprising:
a sensor unit configured to detect a state of the vehicle and an external environment;
a memory configured to store at least one instruction; and
a processor configured to execute the at least one instruction stored in the memory based on data obtained from the sensor unit and the memory, wherein the processor is configured to:
identify a first high-energy spot based on a reference altitude change and map information including altitude data;
cluster high-energy spots based on the first high-energy spot to set a high-energy area and generate area information; and
perform driving power control based on at least location information of the vehicle and the area information in response to a vehicle travel path including the high-energy area,
wherein the high-energy spots are clustered by adding a second high-energy spot to the high-energy area, and
wherein the second high-energy spot is located in a selected radius from the first high-energy spot.

12. The vehicle of claim 11, wherein the processor is further configured to generate the map information comprising representative trend information, and wherein the representative trend information is generated based on a smoothing process of the map information.

13. The vehicle of claim 12, wherein the smoothing process comprises smoothing the altitude data using a Gaussian filter based on a selected filter size, and wherein the filter size is determined based on a unit distance set according to an output performance of an energy source module providing driving power.

14. The vehicle of claim 11, wherein the reference altitude change is defined as an altitude change prompting a change in plan of the driving power control applied to current driving of the vehicle, and the altitude change is an altitude difference value in which driving power to be consumed when the vehicle moves by a set unit distance at a selected speed is determined to be greater than reference power consumption.

15. The vehicle of claim 11, wherein an identification of the first high-energy spot comprises:
selecting a preliminary high-energy spot based on the map information and the reference altitude change;
determining a road type applied according to a type of the vehicle; and
determining the preliminary high-energy spot related to a road belonging to the road type as the first high-energy spot.

16. The vehicle of claim 11, wherein the processor is further configured to generate inclination data based on altitude data of the map information before identifying the first high-energy spot,
wherein the identification of the first high-energy spot comprises extracting the first high-energy spot based on the inclination data and the reference altitude change, and
wherein the area information comprises cluster information of the high-energy area and spot information of the first high-energy spot belonging to the high-energy area.

17. The vehicle of claim 16, wherein the cluster information comprises a maximum altitude, a minimum altitude, and latitude and longitude ranges of the high-energy area, and wherein the spot information comprises inclination data for each high-energy spot.

18. The vehicle of claim 11,
wherein clustering of the high-energy spots comprises grouping high-energy spots within a movement window detected by the movement window using the selected radius,
wherein the selected radius is set greater than a set unit distance based on output performance of an energy source module providing driving power, and
wherein a shift of the movement window is moving the movement window to include the first high-energy spot previously detected within the movement window.

19. The vehicle of claim 11, wherein performing the driving power control comprises:
predicting forward gradient information of a route to be traveled based on a traveling direction of the vehicle along with the location information of the vehicle and the area information; and
performing the driving power control based on the predicted forward gradient information.

20. The vehicle of claim 19, wherein the vehicle comprises an electric energy-based energy source module, and the driving power control is performed to control the energy source module according to a charging-oriented or discharging-oriented power plan based on state information of the energy source module and the forward gradient information.

* * * * *